US008736627B2

(12) United States Patent
Brothers

(10) Patent No.: US 8,736,627 B2
(45) Date of Patent: May 27, 2014

(54) SYSTEMS AND METHODS FOR PROVIDING A SHARED BUFFER IN A MULTIPLE FIFO ENVIRONMENT

(75) Inventor: John Brothers, Calistoga, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1353 days.

(21) Appl. No.: 11/612,573

(22) Filed: Dec. 19, 2006

(65) Prior Publication Data

US 2008/0143733 A1    Jun. 19, 2008

(51) Int. Cl.
*G06F 15/167* (2006.01)

(52) U.S. Cl.
USPC ........... 345/541; 345/558; 345/501; 345/522; 345/506; 345/536; 345/422; 711/128; 711/133; 711/129

(58) Field of Classification Search
USPC ........... 345/501–54, 558, 531, 522, 506, 503, 345/556, 536, 422, 541; 712/1–248; 711/128, 133, 129
See application file for complete search history.

(56) References Cited

U.S. PATENT DOCUMENTS

| 5,185,599 | A * | 2/1993 | Doornink et al. | 345/548 |
|---|---|---|---|---|
| 5,764,243 | A * | 6/1998 | Baldwin | 345/506 |
| 5,821,940 | A * | 10/1998 | Morgan et al. | 345/420 |
| 6,008,820 | A * | 12/1999 | Chauvin et al. | 345/502 |
| 6,252,608 | B1 * | 6/2001 | Snyder et al. | 345/473 |
| 6,272,567 | B1 * | 8/2001 | Pal et al. | 710/56 |
| 6,292,194 | B1 * | 9/2001 | Powell, III | 345/582 |
| 6,326,964 | B1 * | 12/2001 | Snyder et al. | 345/419 |
| 6,597,363 | B1 * | 7/2003 | Duluk et al. | 345/506 |
| 6,636,226 | B2 * | 10/2003 | Morein et al. | 345/555 |
| 6,781,590 | B2 * | 8/2004 | Katsura et al. | 345/538 |
| 6,785,778 | B2 * | 8/2004 | McAllister | 711/145 |
| 6,904,498 | B2 * | 6/2005 | Stolowitz | 711/114 |
| 6,999,415 | B2 * | 2/2006 | Luijten et al. | 370/230 |
| 7,124,168 | B2 * | 10/2006 | Shankar et al. | 709/207 |
| 7,202,872 | B2 * | 4/2007 | Paltashev et al. | 345/555 |
| 7,259,765 | B2 | 8/2007 | Huang | |
| 7,310,100 | B2 * | 12/2007 | Hussain | 345/557 |
| 7,453,800 | B2 * | 11/2008 | Takajitsuko et al. | 370/230 |
| 7,538,783 | B2 * | 5/2009 | MacInnis et al. | 345/660 |
| 7,701,461 | B2 * | 4/2010 | Fouladi et al. | 345/558 |
| 2002/0060684 | A1 * | 5/2002 | Alcorn et al. | 345/552 |
| 2003/0142104 | A1 * | 7/2003 | Lavelle et al. | 345/552 |
| 2003/0145012 | A1 * | 7/2003 | Kurth | 707/100 |
| 2003/0152076 | A1 * | 8/2003 | Lee et al. | 370/389 |
| 2003/0179208 | A1 * | 9/2003 | Lavelle | 345/539 |

(Continued)

FOREIGN PATENT DOCUMENTS

JP    2000-168169    6/2000

OTHER PUBLICATIONS

English language translation of abstract of JP2000-168169.

*Primary Examiner* — Abderrahim Merouan
(74) *Attorney, Agent, or Firm* — McClure, Qualey & Rodack, LLP

(57) ABSTRACT

Provided are methods and systems for reducing memory bandwidth usage in a common buffer, multiple FIFO computing environment. The multiple FIFO's are arranged in coordination with serial processing units, such as in a pipeline processing environment. The multiple FIFO's contain pointers to entry addresses in a common buffer. Each subsequent FIFO receives only pointers that correspond to data that has not been rejected by the corresponding processing unit. Rejected pointers are moved to a free list for reallocation to later data.

16 Claims, 11 Drawing Sheets

(56) References Cited

U.S. PATENT DOCUMENTS

2004/0130552 A1* 7/2004 Duluk et al. .................. 345/506
2005/0093873 A1* 5/2005 Paltashev et al. ............. 345/581
2005/0122339 A1* 6/2005 Andrews et al. ............. 345/557
2005/0163141 A1* 7/2005 Katayama .................... 370/412
2005/0206647 A1* 9/2005 Xu et al. ...................... 345/536
2006/0004989 A1* 1/2006 Golla ........................... 712/214
2007/0165043 A1* 7/2007 Fouladi et al. ................ 345/558
2012/0195317 A1* 8/2012 Parker et al. ................. 370/392

* cited by examiner

SYSTEMS AND METHODS FOR PROVIDING A SHARED BUFFER IN A MULTIPLE FIFO ENVIRONMENT

TECHNICAL FIELD

The present disclosure is generally related to computer processing and, more particularly, is related to using a common data buffer in a graphics processing system.

BACKGROUND

The art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (X, Y, Z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates, X, Y, Z, W in "viewer" coordinates) and some specification of material surface properties (e.g., color, texture, shininess, etc.), as well as possibly the normal vectors to the surface at each vertex. For 3-D objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume to include or eliminate background as desired.

Once this viewing area has been selected, clipping logic eliminates the polygons (e.g., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixels are positioned in the polygon and attempts to write the associated color values and depth (Z value) into frame buffer cover. The rasterizer compares the depth (Z value) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display one scan line at a time in raster order.

With this general background provided, reference is now made to FIG. 1, which shows a functional flow diagram of certain components within a graphics pipeline in a computer graphics system. It will be appreciated that components within graphics pipelines may vary among different systems, and may be illustrated in a variety of ways. As is known, a host computer 10 (or a graphics API running on a host computer) may generate a command list 12, which comprises a series of graphics commands and data for rendering an "environment" on a graphics display. Components within the graphics pipeline may operate on the data and commands within the command list 12 to render a screen in a graphics display.

In this regard, a parser 14 may retrieve data from the command list 12 and "parse" through the data to interpret commands and pass data defining graphics primitives along (or into) the graphics pipeline. In this regard, graphics primitives may be defined by location data (e.g., X, Y, Z, and W coordinates) as well as lighting and texture information. All of this information, for each primitive, may be retrieved by the parser 14 from the command list 12, and passed to a vertex shader 16. The vertex shader 16 may perform various transformations on the graphics data received from the command list. In this regard, the data may be transformed from World coordinates into Model View coordinates, into Projection coordinates, and ultimately into Screen coordinates. Thereafter, the graphics data may be passed onto rasterizer 18, which operates as summarized above.

Thereafter, a Z-test 20 is performed on each pixel within the primitive. Comparing a current Z-value (e.g., a Z-value for a given pixel of the current primitive) with a stored Z-value for the corresponding pixel location performs a Z-test. The stored Z-value provides the depth value for a previously rendered primitive for a given pixel location. If the current Z-value indicates a depth that is closer to the viewer's eye than the stored Z-value, then the current Z-value will replace the stored Z-value and the current graphic information (e.g., color) will replace the color information in the corresponding frame buffer pixel location (as determined by the pixel shader 22). If the current Z-value is not closer to the current viewpoint than the stored Z-value, then neither the frame buffer nor Z test unit contents need to be replaced, as a previously rendered pixel will be deemed to be in front of the current pixel. For pixels within primitives that are rendered and determined to be closer to the viewpoint than previously-stored pixels, information relating to the primitive is passed on to the pixel shader 22, which determines color information for at least one of the pixels within the primitive that are determined to be closer to the current viewpoint.

The multiple steps of processing associated with a pipeline may be accomplished using a plurality of data storage buffers between stages. Efficient implementations of data storage buffers can provide significant performance benefits as well as reduce overall hardware expenses for data buffering. Modern GPU pipelines have significantly complex shape and efficient implementation of data storage buffers can become a challenge. Thus, a heretofore-unaddressed need exists in the industry to address the aforementioned deficiencies and inadequacies.

SUMMARY

Embodiments of the present disclosure provide a system sharing a buffer in a multiple FIFO computer graphics processing environment, comprising: a shared buffer configured to receive a plurality of attribute values corresponding to a plurality of graphics data values; a plurality of data processing components, organized serially in a computer graphics pipeline, configured to process the plurality of graphics data values; a plurality of pointer arrays, organized serially in a computer graphics pipeline and configured to maintain a plurality of pointers, corresponding to the plurality of attribute values in a shared buffer; and a buffer mask configured to identify a location of available memory in the shared buffer.

Briefly described, in architecture, one embodiment, among others, can be implemented as a system for utilizing a common buffer in a multiple FIFO computing environment, comprising: free list logic configured to maintain availability information regarding a plurality of entry addresses in a common buffer; FIFO logic configured to store and transfer a plurality of pointer values through a plurality of serially arranged FIFO's between pipeline blocks; pipeline logic configured to process data utilizing a plurality of serially arranged processing units; and pointer logic configured to discard any of the plurality of pointers, that correspond to data of a rejected graphics primitive, from a subsequent one of the plurality of serially arranged FIFO's.

An embodiment of the present disclosure can also be viewed as providing methods for providing a common buffer in a computing environment having multiple first-in-first-out buffers. In this regard, one embodiment of such a method, among others, can be broadly summarized by the following steps: determining, in an attribute setup unit, a plurality of attribute values; reading a free list, configured to mask unavailable addresses in a common buffer, to establish a plurality of entry addresses in the common buffer, corresponding to the plurality of attribute values; writing the plurality of attribute values to the plurality of entry addresses in the common buffer; writing a plurality of pointers, corresponding to the plurality of entry addresses, to a first pointer FIFO; tracking, in a first processing unit, a plurality of primitive pixel tiles to determine if any of the plurality of primitives is rejected; copying, to the free list, a portion of the plurality of pointers corresponding to rejected tiles; and transferring, to a second pointer FIFO, any of the plurality of pointers corresponding to primitives with pixel tiles that are not rejected.

Another embodiment of the present disclosure can be viewed as providing a method for reducing memory bandwidth usage in a common buffer of multiple FIFO computing environment, comprising: processing, serially, a plurality of data values in a plurality of pipeline processing units; storing primitive attribute delta data and state data, in a common buffer, corresponding to the plurality of data values; maintaining a plurality of pointers, corresponding to the plurality of data values, in a plurality of first-in-first-out buffers; and discarding a portion of the plurality of pointers, corresponding to a portion of the plurality of primitive data values that have been rejected by one of the plurality of pipeline processing units.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
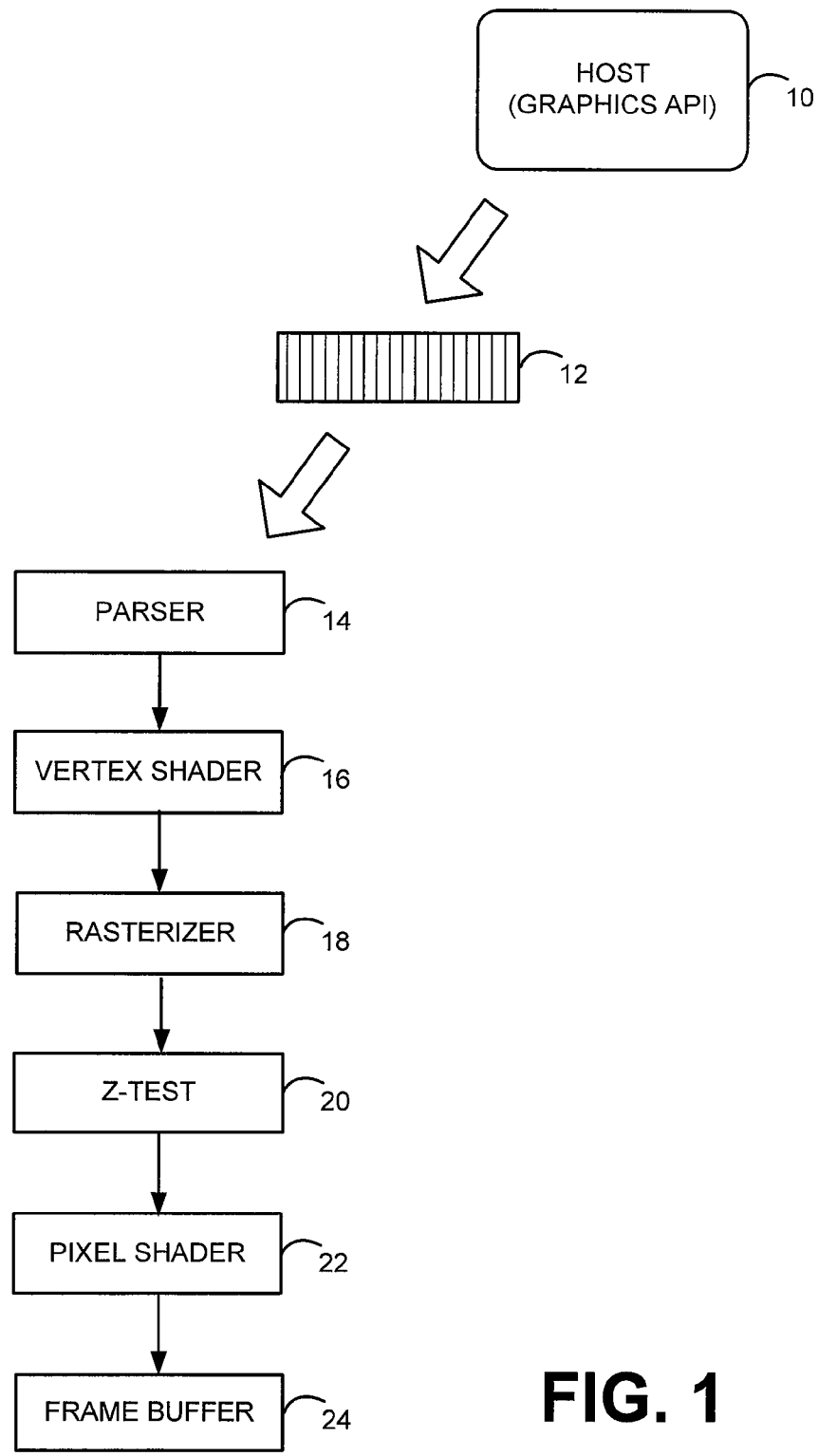
FIG. 1 illustrates a functional flow diagram of certain components within a graphics pipeline in a computer graphics system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed therein. On the contrary, the intent is to cover all alternatives, modifications and equivalents included within the spirit and scope of the disclosure as defined by the appended claims.

As will be described further herein, there are several locations in a graphics system where features or aspects of the disclosure may be implemented. Likewise, it will be appreciated from the description herein that there are systems and environments in fields other than computer graphics where the concepts of the disclosure may be employed.

Figure 2:
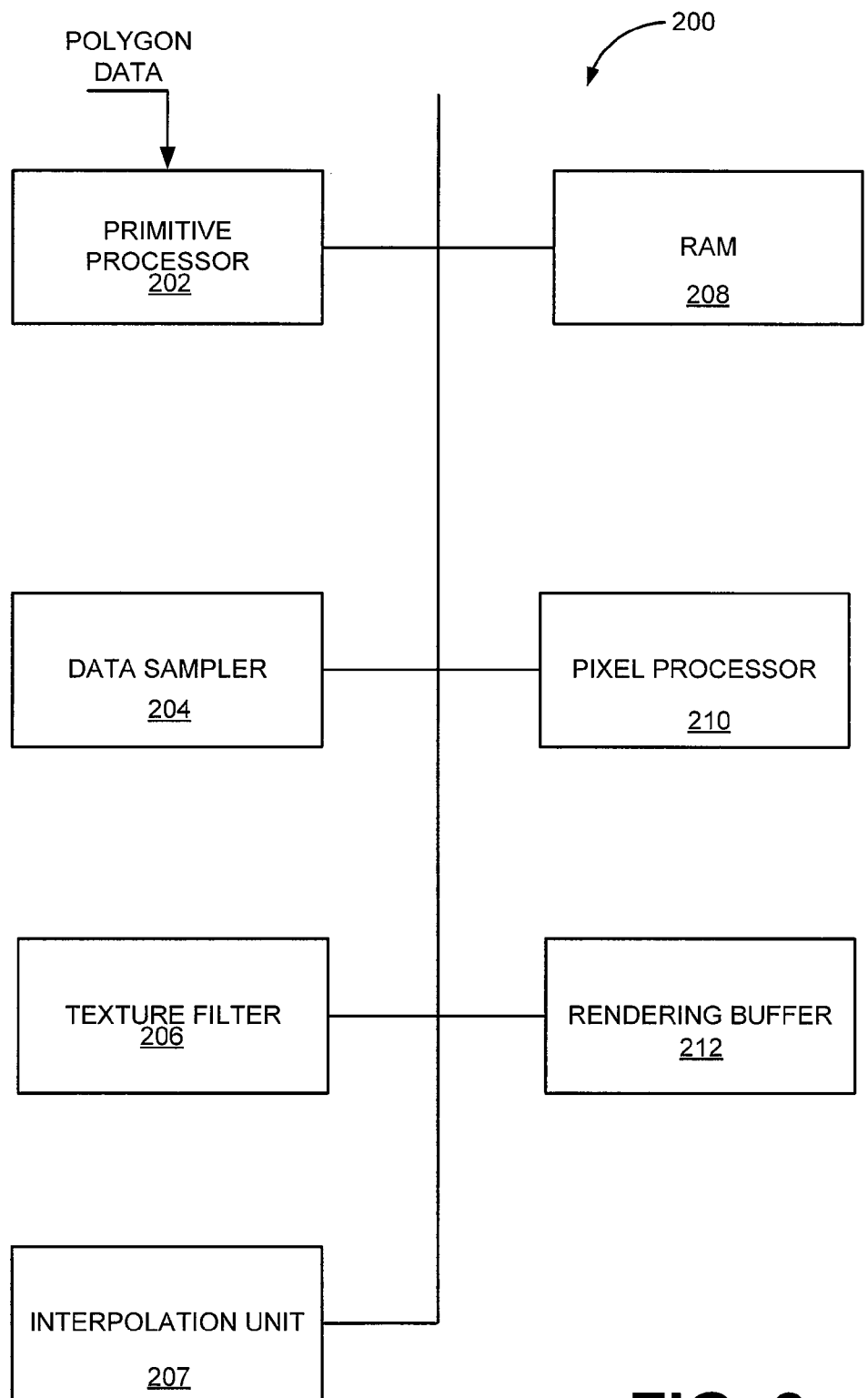
FIG. 2 is a block diagram illustrating an exemplary system 200 for performing pipeline buffering operations.

Reference is briefly made to FIG. 2, which is a block diagram illustrating an exemplary system 200 for performing pipeline buffering operations of the present disclosure. The system 200 may be implemented in a graphics processing system within a computer or similar processing device. The system 200 includes a primitive processor 202, a data sampler 204, a texture filter 206, RAM 208 for storing textures, a pixel processor 210, and a rendering buffer 212. Additionally included in the nonlimiting example of FIG. 2 is an interpolation unit 207.

The primitive processor 202, which may be a triangle setup processor, may be configured to receive three-dimensional ("3D") geometry elements (e.g., triangles or other graphic primitives) and processes the data describing the size, shape, position, and other relative characteristics of the graphics primitives. In some cases, the primitive processor 202 is also capable of generating edge functions of the primitives. These primitives may be defined in 3D using Euclidean coordinates or in four-dimensions ("4D") using homogenous coordinates, and subsequently, projected onto a two-dimensional ("2D") plane by a known algorithm.

The data sampler 204 selects a finite set of values from the polygon data received by the primitive processor 202. The sampling of the polygon data may occur at different resolutions. For example, interior portions of a polygon may be sampled at a rate, which may be desired to generate the destination screen resolution, while the detected edges of a polygon may be super-sampled at a higher resolution.

The texture filter 206 performs one (or more) of the filtering techniques (e.g., bilinear filtering, trilinear filtering, box filtering, and/or a combination thereof) to calculate the color value (or other attribute) of a new texel, which is then assigned to a particular pixel. The texture filter 206 may generate the filtered textured pixel values based on data received from the RAM 208. Additionally, the texture filter 206 may be used in various types of applications such as rendering multi-rate data samples (polygon data sampling at different resolutions).

The pixel processor 210 may be configured to perform rendering operations. The rendering operations may be altered in a selected manner to generate various effects such as simulated light sources and shadows. Pixel processing includes an interpolation unit that receives attribute data, such as, component delta and state values and optionally texture data from the texture filter. Finally, the rendering buffer 212 stores images, which may be displayed in a display device or used to render another image. Also included is an interpolation unit 207, such as discussed below, with reference to interpolation unit 420 of FIG. 4.

Figure 3:
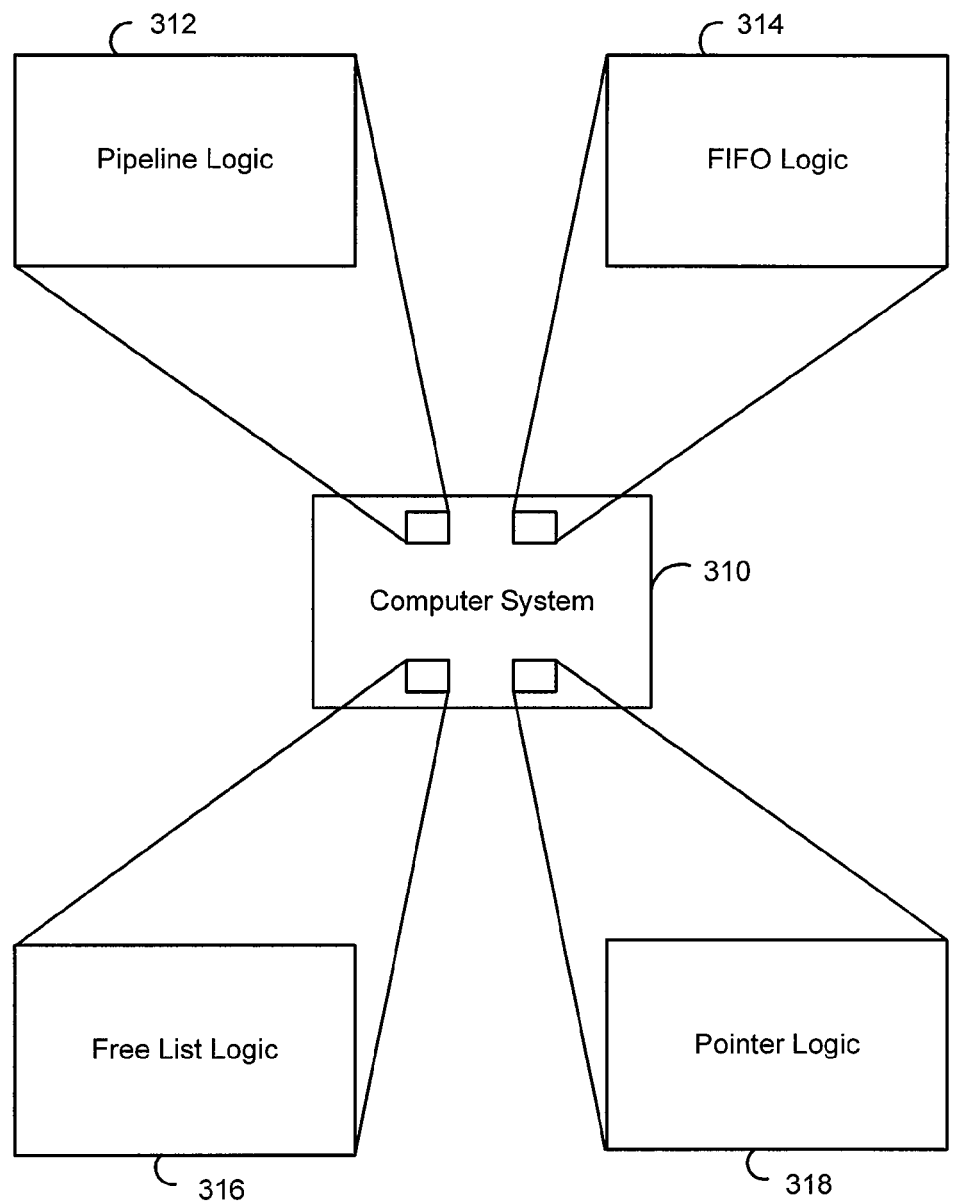
FIG. 3 illustrates certain basic components of an embodiment of the disclosure.

Reference is made briefly to FIG. 3, which illustrates certain basic components of an embodiment of the disclosure. FIG. 3 includes a component labeled "Computer System 310", which may designate or represent hardware components in a graphics pipeline. Within this component, pipeline logic 312 may be provided for processing data in a serial manner. The component also includes FIFO logic 314 configured to store and transfer pointers that correspond to primitive component delta and state values. One of ordinary skill in the art will understand that the term FIFO may refer to first-in-first-out operations. The delta and state values are stored in a shared or common buffer coordinated by free list logic 316. The free list logic 316 maintains the availability status of the entry addresses in the common buffer. Pointer logic 318 serves to discard the pointers that correspond to data that is rejected from the pipeline logic 312. By discarding a pointer, the entry address in the common buffer that corresponds to that pointer becomes listed as available or free and therefore can be overwritten by future data entries from primitive processor 202.

Figure 4:
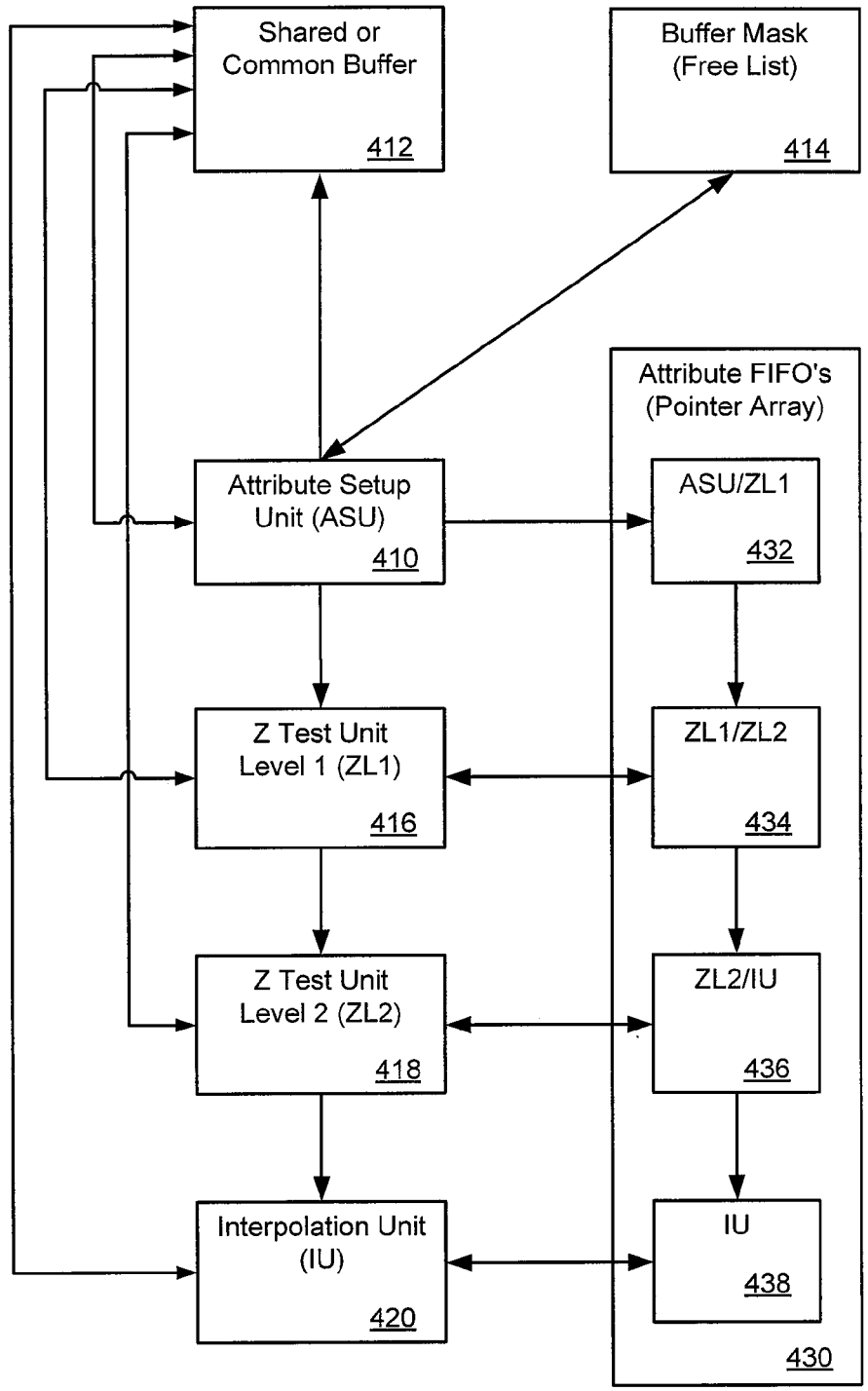
FIG. 4 is a block diagram illustrating the interoperation between system components in an exemplary embodiment, as disclosed herein.

Reference is now made to FIG. 4, which is a block diagram illustrating the interoperation of system components in an exemplary embodiment, as disclosed herein. The attribute setup unit (ASU) 410, which is a part of primitive processor 202, may be configured to generate component delta and state values that are read by the interpolation unit (IU) 420 to compute texture coordinates and pixel components required in the pixel shader (not shown), as well as delta values for Z-interpolation in ZL1 (Z-test unit Level 1) 416 and ZL2 (Z-test unit Level 2) 418. The primitive delta and state values are stored in a common buffer 412. The ASU 410 reads a buffer mask 414, also referred to as a free list, to determine which of the entry addresses in the common buffer 412, if any, are available to receive the delta/state values. When the ASU 410 receives the free entry address data from the buffer mask 414, the delta/state value is stored at the location specified by the entry address and a pointer value, corresponding to that entry address, is stored in the ASU/ZL1 FIFO 432. One of ordinary skill in the art will appreciate that a pointer FIFO may more broadly be described as a pointer array within the scope and spirit of this disclosure. The attribute setup unit (ASU) 410, Z-test unit (ZL1) 416, Z-test unit (ZL2) 418, and interpolation unit (IU) 420 may more broadly be described as data processing components.

The ASU/ZL1 FIFO 432 is one of a series of attribute FIFO's 430, also referred to as pointer FIFO's or pointer arrays, that are configured to eliminate continued processing of data after it is rejected in the pipeline, as well as sending delta/state values from stage to stage between pipeline blocks. The first three FIFO's are arranged such that they coordinate to the transition between serially arranged pipeline processing units. In the pipeline, the processing units after the ASU 410, are the level 1 Z test unit (ZL1) 416, the level 2 Z test unit (ZL2) 418, and the interpolation unit (IU) 420. Each adjacent pair of the pipeline processing units includes a pointer FIFO. Thus, for the above-listed pipeline processing units, the attribute FIFO's 430 include the ASU/ZL1 FIFO 432, the ZL1/ZL2 FIFO 434 and the ZL2/IU FIFO 436. Additionally, where the IU 420 has to wait for texture data before processing some of the delta values, an IU FIFO 438 is provided to compensate for data latency. One should note that the Z-test unit Level 1 (ZL1) 416 and Z-test Unit Level 2 (ZL2) 418 may be combined into one Z-test unit, consisting with the scope and spirit of this disclosure.

Attribute pointers may be used by the unit described above to retrieve primitive attribute data for processing in a particular unit. The data may be read via a data path from a common shared buffer 412 to one or more of the pipeline units 410, 416, 418, 420.

Generally, the pointer data is transmitted from one of the attribute pointer FIFO's 430 to the next FIFO, corresponding to the data flow through the pipeline such that the pointer is transferred from one attribute pointer FIFO to the next attribute pointer FIFO. However, in the circumstance where ZL1 416, for example, rejects a triangle, the pointer for that triangle attribute is not transmitted from the ASU/ZL1 FIFO 432 to the ZL1/ZL2 FIFO 434. Instead, the buffer mask 414 is updated to free the entry address in the common buffer associated with that pointer. In this way, the common buffer 412 is made available for future data without risking overwriting valid data. The transition between each of the pipeline processing units provides the opportunity to discard rejected pointers and to free capacity in the common buffer 412. Thus, the pointers that reach the IU may correspond to valid data only.

Figure 5:
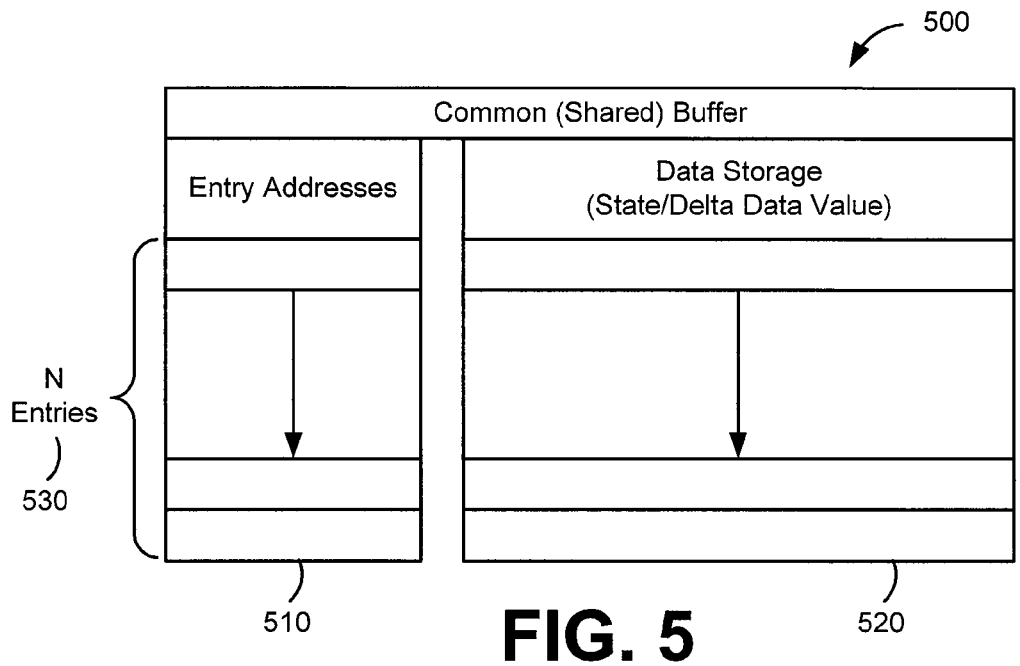
FIG. 5 is a block diagram illustrating an exemplary embodiment of a common buffer.

Reference is now made to FIG. 5, which is a block diagram illustrating an exemplary embodiment of a common buffer, as disclosed herein. The common buffer 500 can be thought of as a block of memory for data storage having multiple data storage fields 520 each having a corresponding entry address 510. Although, as illustrated, the entry addresses 510 are within the common buffer 500, one of ordinary skill in the art knows or will know that the entry address may be located in a separate area of memory and be defined using, for example, a base address and an offset. Although the data storage fields 520 are shown as a single field, one of ordinary skill in the art will appreciate that each data storage field can physically or logically contain more than one field for storing more than one value within the scope and spirit of this disclosure. The common buffer 500 includes N entries 530 capable of storing N data values or sets of data values.

Figure 6:
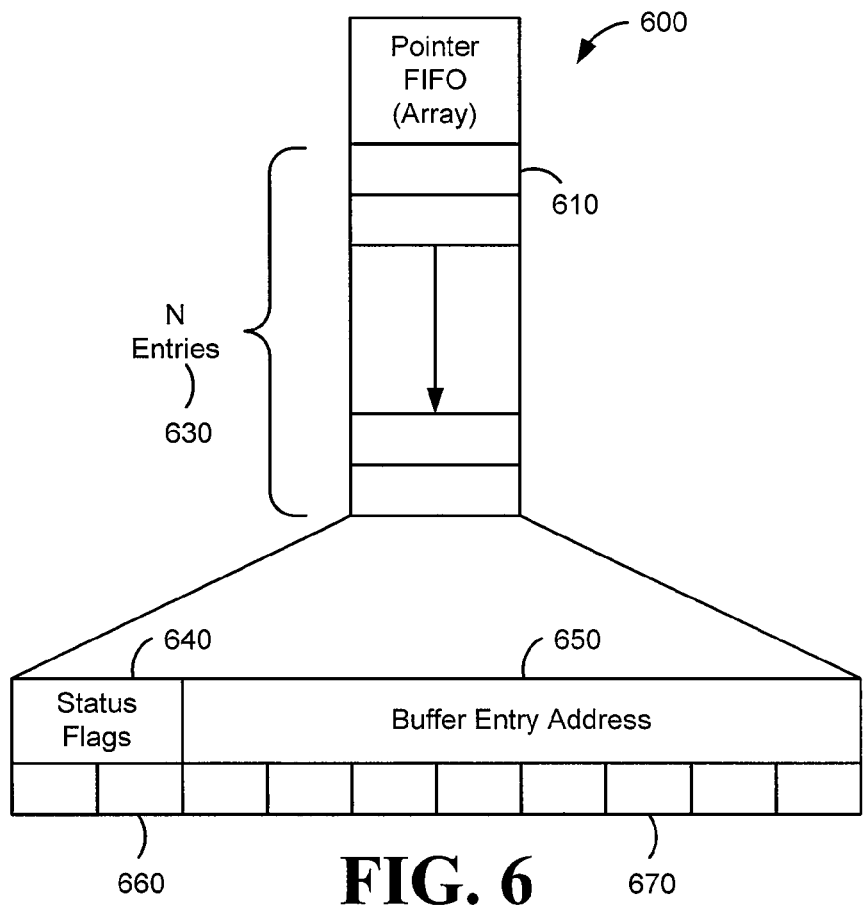
FIG. 6 illustrates an embodiment of a pointer FIFO or array, as disclosed herein.

Reference is now made to FIG. 6, which illustrates an embodiment of a pointer FIFO or array, as disclosed herein. The pointer FIFO 600 includes N entries 630 where each pointer FIFO entry 610 stores one pointer and can store a pointer for all entries in the common buffer. As discussed above, the pointer includes the buffer entry address 650. Although the buffer entry address 650 of the illustrated embodiment includes eight-bits 670 of data storage, one of ordinary skill in the art will appreciate that a buffer entry address 650 utilizing an address having more or less than eight-bits is contemplated within the scope and spirit of this disclosure. The pointer may also be configured to include a field containing status flags 640. The status flags 640 can include a plurality of individual bits 660 signaling, by way of example, the distinction between a delta value and a state value or that a particular delta value is the last value for that triangle. These examples are provided for illustrative purposes and should not be limiting upon the embodiments defined by the claims. An alternative embodiment can utilize more or less than two status flags within the scope and spirit of this disclosure.

Figure 7:
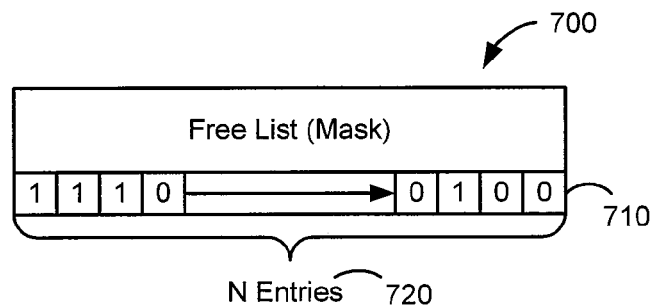
FIG. 7 illustrates an embodiment of a buffer mask or free list, as disclosed herein.

Reference is now made to FIG. 7, which illustrates an embodiment of a buffer mask or free list, as disclosed herein. The free list 700 includes N one-bit entries 720 corresponding to each entry address in the common buffer, as discussed above. A free list entry stores either a "0" or a "1" depending on whether the corresponding entry in the common buffer is in use or free for use. For example, each free list entry 710 that has a "1" is free for use to store data in a subsequent process. A free list entry 710 that has a "0" is in use and is therefore unavailable for use. In this way, the common buffer protects valid data from overwriting while providing efficient recovery of capacity of memory that is occupied by data for rejected pixels. Special logic may encode the position of a bit in a free list to the number of entry or pointer, which can be used by the ASU to write the data to a the common buffer.

Figure 8:
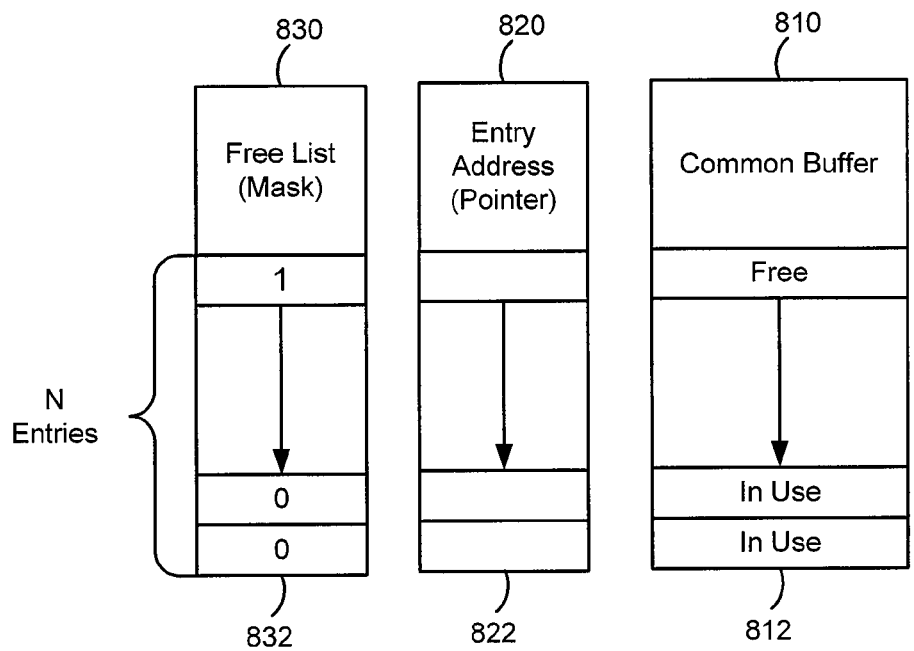
FIG. 8 is a block diagram illustrating an exemplary embodiment of the interoperation between the free list, the pointer, and the common buffer, as disclosed herein.

Reference is briefly made to FIG. 8, which is a block diagram illustrating an exemplary embodiment of the inter-operation between the free list, the pointer, and the common buffer, as disclosed herein. The common buffer 810 provides multiple data storage locations 812 that each are identified by a corresponding pointer 822. Additionally, each of these data storage locations 812 has a corresponding mask bit 832 in the free list 830. The common buffer 810 and the free list 830 contain the same number of N entries and have N corresponding entry addresses 820. Note that the entries marked with a "0" in the free list are listed as "in use" in the buffer whereas, the entry marked with a "1" in the free list is listed as "free" in the buffer.

Figure 9:
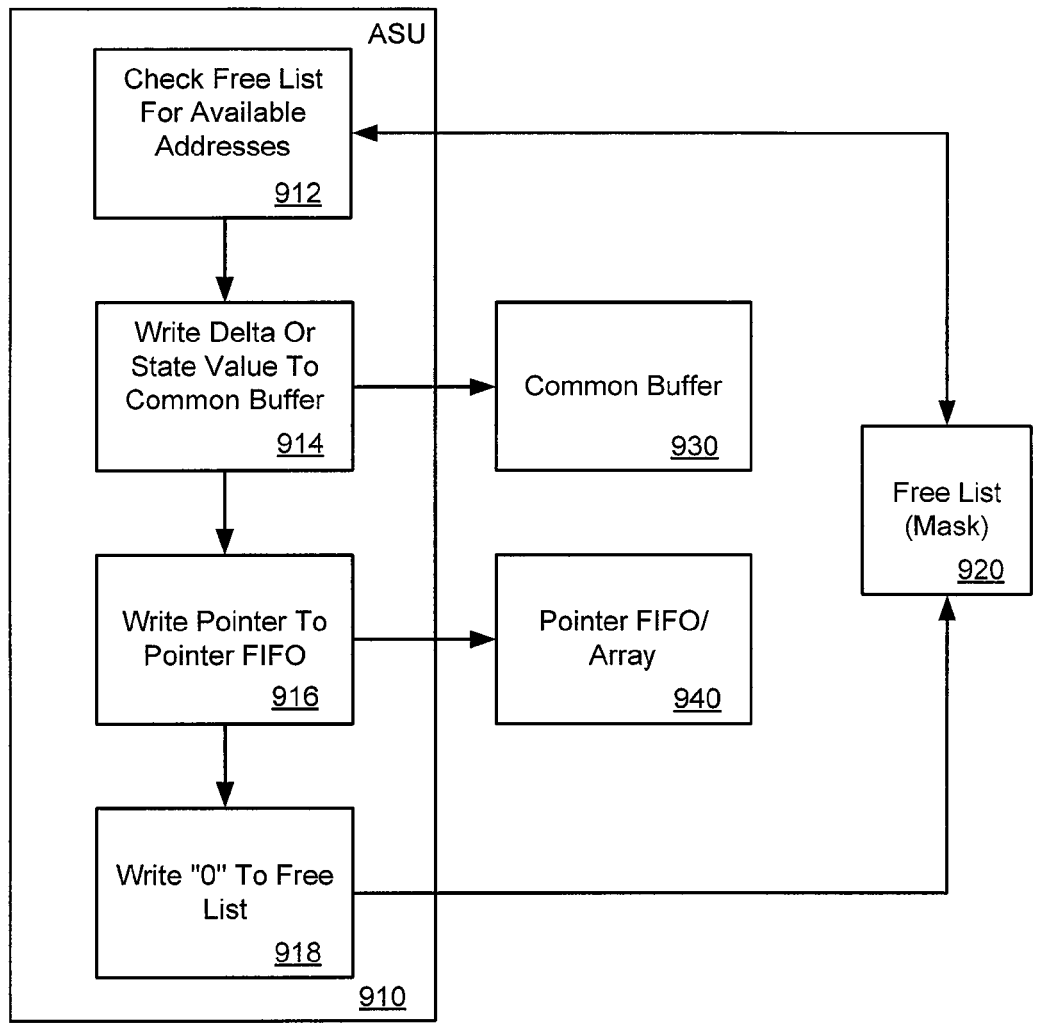
FIG. 9 is a block diagram illustrating an exemplary embodiment of the ASU and the functions therein, as disclosed herein.

Reference is briefly made to FIG. 9, which is a block diagram illustrating an exemplary embodiment of the ASU and the functions therein, as disclosed herein. The ASU 910 checks the free list 920 for available entry addresses in the common buffer in block 912. The ASU 910 then writes delta and/or state values to the common buffer 930 in step 914. A pointer value is written to the pointer FIFO 940 in step 916 and a "0" is written to the corresponding position in the free list 920 in step 918. After the ASU 910, the data processing advances to ZL1 1010 (as shown in FIG. 10).

Figure 10:
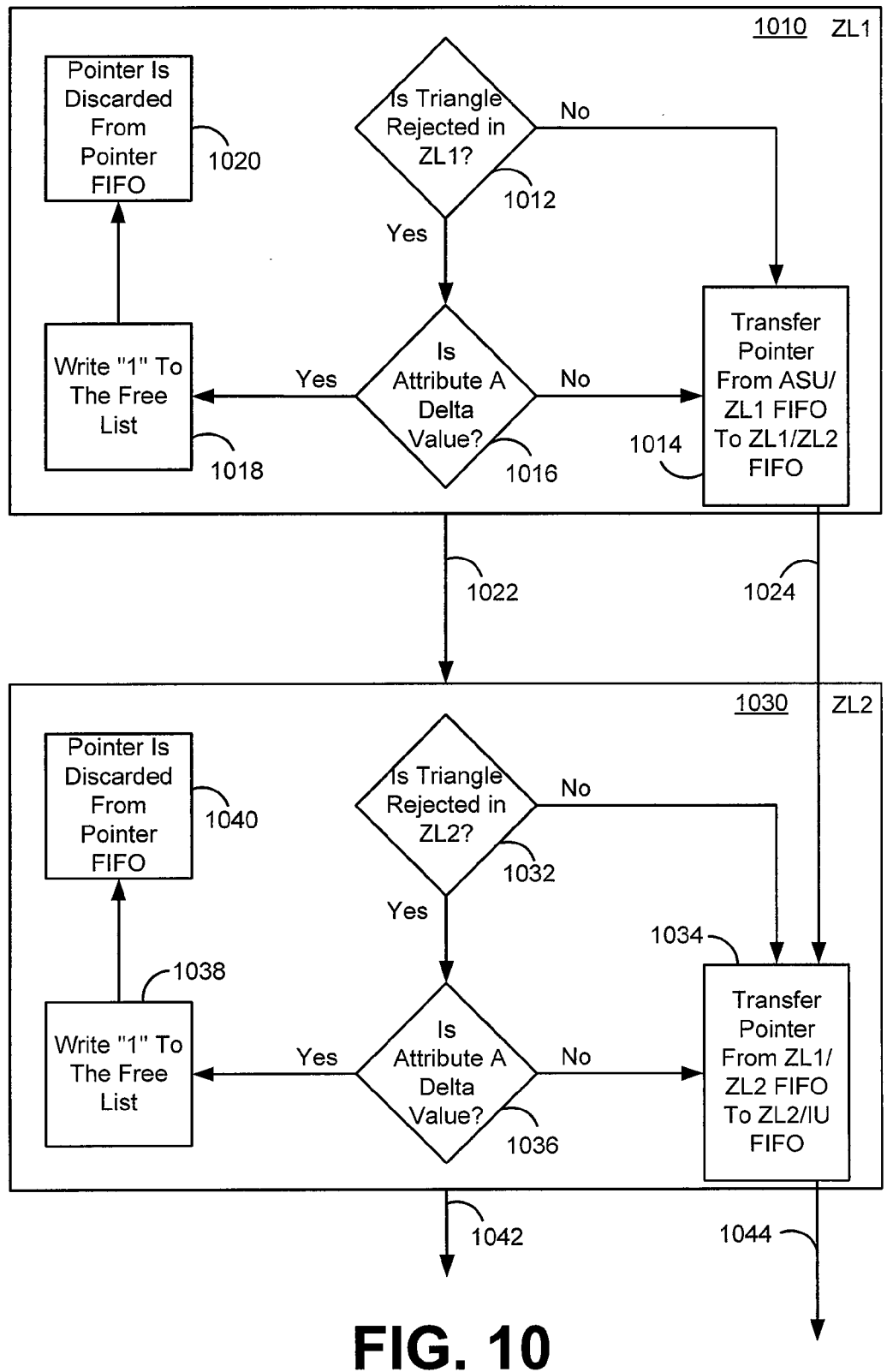
FIG. 10 is a block diagram illustrating an exemplary embodiment of ZL1 and ZL2 as related to the attribute pointer FIFO's.

Referring now to FIG. 10, which is a block diagram illustrating an exemplary embodiment of ZL1 and ZL2 as related to the attribute pointer FIFO's. A reduction in memory traffic is accomplished by eliminating unnecessary reading of data from the common buffer. First, a determination is made as to whether a triangle is rejected in ZL1 1010 in step 1012. If the triangle is not rejected, then the pointer is transferred from the ASU/ZL1 FIFO to the ZL1/ZL2 FIFO in step 1014. In the alternative, where the triangle is rejected in ZL1 1010, a status flag of the pointer is read, in step 1016, to determine if the attribute stored in the common buffer is a delta value. If the attribute is not a delta value then it is a state value and is retained for processing by the IU by transferring the pointer in accordance with step 1014, discussed above. If the attribute is a delta value, then a "1" is written to the free list corresponding to that entry in the common buffer in step 1018 and the pointer is discarded from the pointer FIFO in step 1020.

The pipeline data proceeds down the pipeline from ZL1 to ZL2 as shown by arrow 1022. Similarly, the attribute pointers that are not rejected are transferred to the next pointer FIFO via arrow 1024. The processing within ZL2 is similar to that of ZL1 regarding the pointer FIFO but with the remaining valid pointers being transferred from the ZL1 416/ZL2 418 FIFO to the ZL2 418/IU 420 FIFO in step 1034. By writing a "1" to the corresponding bit in the free list, subsequent processes have the most available access to the common buffer without a risk of overwriting valid data. Moreover, by discarding the pointers corresponding to rejected pixels, the IU may utilize the requisite amount of data traffic by only requesting data values from the common buffer that are related to valid triangles left after rejection. One should note, that in at least one embodiment the attribute setup unit 410, Z test unit level 416, 418, 420, etc. may be generalized as data processing components. The pipeline data proceeds from ZL2 as shown by arrow 1042. Similarly, the attribute pointers that are not rejected are transferred to the next pointer FIFO via arrow 1044.

Figure 11:
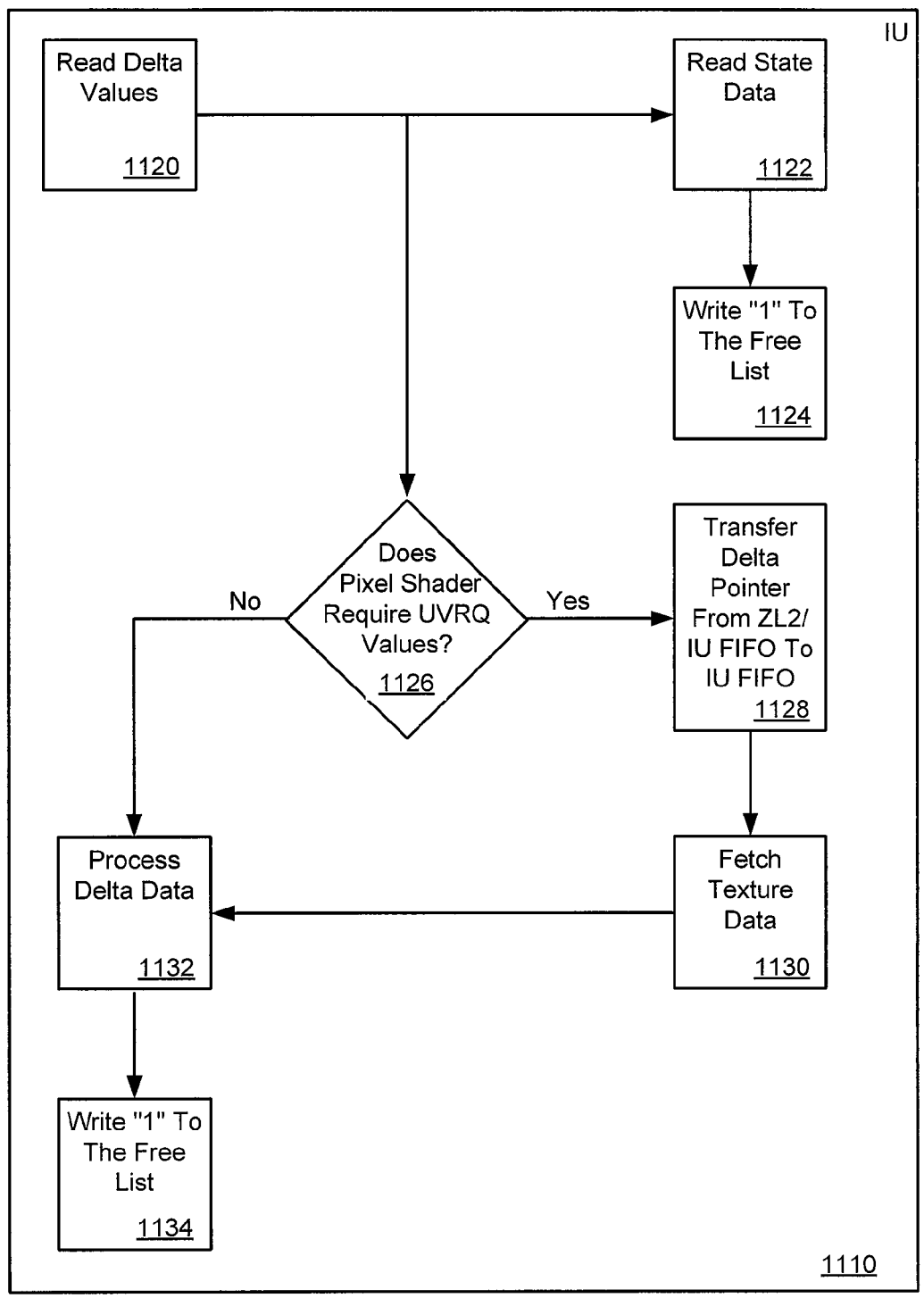
FIG. 11 illustrates an exemplary embodiment of the interpolation unit as related to the attribute pointer FIFO's disclosed herein.

Reference is now made to FIG. 11, which illustrates an exemplary embodiment of the interpolation unit as related to the attribute pointer FIFO's disclosed herein. The IU 1110 uses the pointer values to read the delta values in step 1120 and the state values in step 1122. After the state data is read, the IU 1110, as shown in step 1124, writes a "1" to the free list corresponding to the entry addresses and discards the corresponding pointers from the pointer FIFO. Regarding the delta values, the IU determines if the pixel shader requires UVRQ values in step 1126. If the UVRQ values are not required, the delta data is processed in step 1132 and a corresponding "1" is written to the free list for each value in step 1134. In the alternative, if the UVRQ values are required by the pixel shader, then the delta data pointers are transferred from the ZL2/IU FIFO to the IU FIFO in step 1128. The IU FIFO accommodates the latency until the texture data arrives in step 1130. After the texture data arrives 1130, the delta data is processed in step 1132 and the corresponding "1" is written to the free list for each data value. The IU 1110 will ultimately clear all entries in the ZL2/IU and IU FIFO's. Additionally, some embodiments may include an attribute delta data pointer that corresponds to the delta data. Similarly, some embodiments may include a state data pointer that corresponds to the state data of the triangle. Depending on the particular configuration, the state data pointer can be transferred to an adjacent pointer array. The attribute delta data pointer can be discarded depending on visibility, while the state data pointer may be configured to stay until consumed. The tag can convey information regarding the data type being pointed (attribute delta or state). The state data pointer may be similar to the attribute delta data pointer, but may have a tag (flag field) with a different value.

Figure 12:
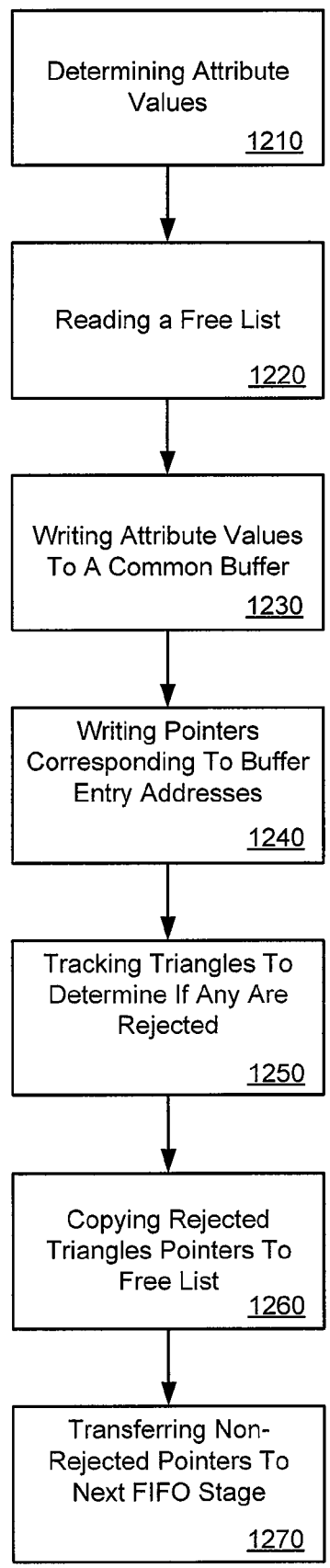
FIG. 12 is a block diagram illustrating an exemplary embodiment of a method as disclosed herein.

Reference is now made to FIG. 12, which is a block diagram illustrating an exemplary embodiment of a method as disclosed herein. First, a plurality of attribute values is determined in block 1210. These values are generally either primitive component delta values or state values. A free list, also referred to as a buffer mask, is read, in block 1220, to determine which entry addresses in a common buffer are available for subsequent use. In block 1230, the attribute values are written to the common buffer at the addresses listed as available by the free list. Pointers corresponding to the buffer entry addresses are written to pointer arrays or FIFO's in block 1240. Triangles (primitives) in a pipeline process are tracked to determine if any are rejected in block 1250. Bits corresponding to the pointers for rejected triangles are copied to the free list in block 1260. In block 1270, pointers corresponding to non-rejected tiles are transferred to a subsequent pointer FIFO stage. In this manner, as discussed above, pointers for valid data may ultimately be delivered to the IU thereby reducing the memory traffic between the IU and the common buffer. Additionally, if a triangle on ZL1 is discarded, ZL2 may never read the attribute of this triangle from common buffer. One should note that, depending on the particular embodiment, a pointer can include an index bit, an index field, one or more status flag bits, and a flag field.

Figure 13:
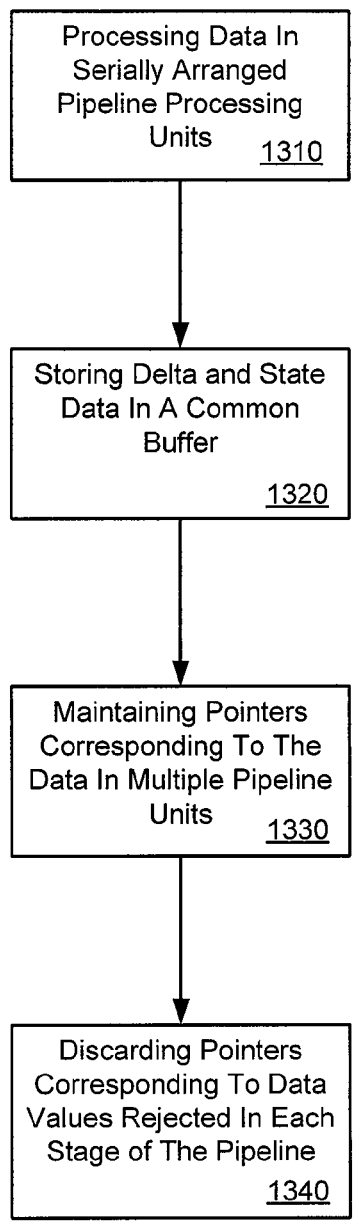
FIG. 13 is a block diagram illustrating another exemplary embodiment of a method as disclosed herein.

Reference is now made to FIG. 13, which is a block diagram illustrating another exemplary embodiment of a method as disclosed herein. Data is processed in serially arranged pipeline processing units at block 1310. In block 1320, delta and state values are stored in a common buffer for later use by an IU in the pipeline to compute texture coordinates and pixel components. Pointers corresponding to the entry addresses in the common buffer are maintained, in block 1330, in multiple pointer FIFO's. At block 1340, pointers that correspond to data rejected in the pipeline are discarded before reaching the IU. Discarding the pointers for the rejected data reduces the memory traffic between the IU and the common buffer by eliminating requests for unnecessary data from the common buffer. One should note that, depending on the particular embodiment, a pointer can include an index bit, an index field, one or more status flag bits, and a flag field.

The embodiments or features of the present disclosure can be implemented in hardware, software, firmware, or a combination thereof. The illustrated embodiment(s) may be implemented in software or firmware that is stored in a memory and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. A system for sharing a buffer in a computer graphics processing environment, comprising:
    a shared buffer configured to receive and store a plurality of attribute values corresponding to a plurality of graphics data values;
    a plurality of data processing components, organized serially in a computer graphics pipeline, configured to process the plurality of graphics data values;
    a plurality of pointer arrays organized serially along a path that is parallel to the computer graphics pipeline, the pointer arrays configured to maintain a plurality of pointers that point to entry addresses of the shared buffer, the entry addresses corresponding to data storage fields of the shared buffer for storing the plurality of attribute values, wherein the plurality of pointers is forwarded along the path parallel to the computer graphics pipeline; and
    a buffer mask configured to identify an availability of at least one entry address of the shared buffer, the availability indicating whether or not the data storage field corresponding to the respective entry address is free to receive new attribute values, allowing graphics data values stored in the data storage field corresponding to the respective entry address to be overwritten.

2. The system of claim 1, wherein the buffer mask includes a plurality of bits corresponding to a plurality of addresses in the shared buffer.

3. The system of claim 1, wherein one of the plurality of data processing components comprises an attribute setup unit, configured to generate the plurality of attribute values, and another of the plurality of data processing components comprises a Z test unit.

4. The system of claim 3, wherein one of the plurality of pointer arrays comprises a first pointer array logically configured between the attribute setup unit and the Z test unit.

5. The system of claim 4, further comprising:
    a first triangle; and
    a first bit, corresponding to a first shared buffer memory address, wherein if the first triangle is rejected by the Z test unit then the first bit is written to the buffer mask.

6. The system of claim 5, further comprising a first pointer of the plurality of pointers, wherein the first pointer is discarded from the first pointer array and wherein the first pointer corresponds to the first triangle, if the first triangle is rejected by the Z test unit.

7. The system of claim 1, wherein each of the plurality of pointer arrays corresponds to two of the plurality of data processing components.

8. The system of claim 7, further comprising:
- a triangle; and
- an attribute delta data pointer, corresponding to the triangle delta data of the triangle;
  wherein if the triangle is rejected by one of the plurality of data processing components then the attribute delta data pointer is discarded by the one of the plurality of pointer arrays that corresponds to the one of the plurality of data processing units.

9. The system of claim 8, further comprising a state data pointer, corresponding to state data of the triangle, wherein the state data pointer is transferred to an adjacent one of the plurality of pointer arrays.

10. The system of claim 1, wherein each of the plurality of pointer arrays comprises capacity to maintain a number of pointers equal to a number of addresses in the shared buffer.

11. The system of claim 1, wherein one of the data processing components comprises an interpolation unit.

12. The system of claim 11, wherein one of the plurality of pointer arrays is configured to compensate for texture read latency and corresponds to the interpolation unit and wherein each of the plurality of pointer arrays comprises a first-in-first-out buffer.

13. The system of claim 1, wherein a portion of the plurality of attribute values comprises triangle delta data.

14. The system of claim 13, wherein another portion of the plurality of attribute values comprises state data.

15. The system of claim 1, wherein the overwritten graphics data values are data rejected by the computer graphics pipeline.

16. The system of claim 15, wherein, by overwriting the graphics data values rejected by the computer graphics pipeline, the buffer mask eliminates the continued processing of the rejected graphics data values.

* * * * *